Dec. 31, 1929. R. W. HAGEN Re. 17,546

DRUM

Original Filed Feb. 1, 1923

INVENTOR:
RUSSELL W. HAGEN.

BY Harry A. Beiner
ATTORNEY.

Reissued Dec. 31, 1929 Re. 17,546

UNITED STATES PATENT OFFICE

RUSSELL W. HAGEN, OF CHICAGO, ILLINOIS, ASSIGNOR TO JULIUS A. MEYER, OF ST. LOUIS, MISSOURI

DRUM

Original No. 1,615,202, dated January 18, 1927, Serial No. 616,308, filed February 1, 1923. Application for reissue filed October 19, 1928. Serial No. 313,600.

My invention consists generally in a drum having a resonating chamber formed in the shell which intensifies the tone quality of the drum and at the same time provides means for housing certain adjustment parts of the drum.

Further object of the invention is to simplify and improve the construction of drums and particularly the tension devices for the heads. Further advantages will be better apparent from a detailed description of the invention in connection with accompanying drawings, in which—

Figure 1:
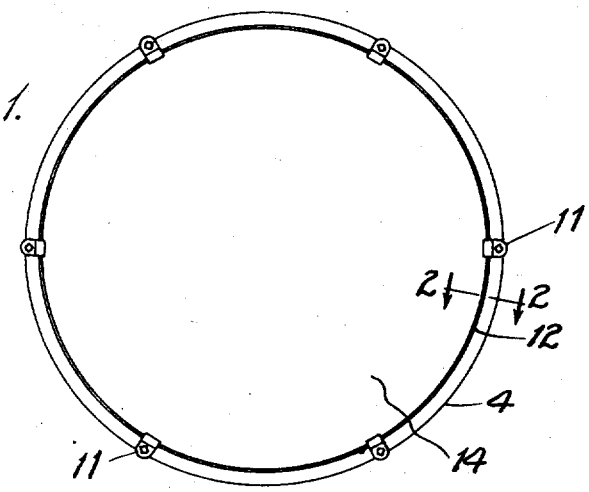
Fig. 1 is a plan view of a drum embodying my invention.
Figure 2:
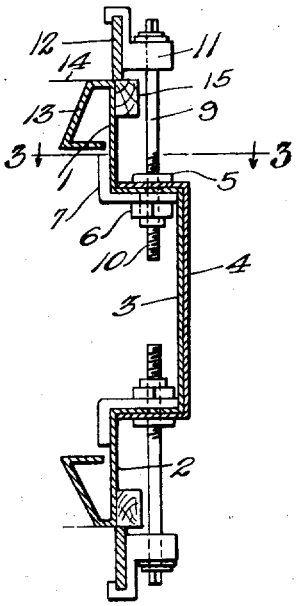
Fig. 2 is an enlarged sectional view substantially along the line 2—2 of Fig. 1.
Figure 3:
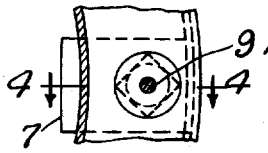
Fig. 3 is an enlarged sectional view substantially along the line 3—3 of Fig. 2.
Figure 4:
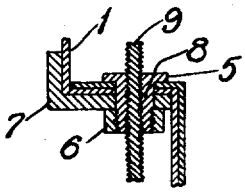
Fig. 4 is a detail sectional view substantially along the line 4—4 of Fig. 3.

In the construction shown in the drawings, the body of the drum is formed by two annular parts 1 and 2, preferably formed of metal. The parts 1 and 2 are formed with channel portions 3 and 4 respectively which extend outwardly from the plane of the upper and lowermost extremities of the drum body. These channels, it will be observed interfit. In assembling the parts 1 and 2 together, the free margin of the channel portion 4, is left as forming a continuation of said channel portion and the other channel portion 3 is then inserted therein, after which said marginal portion is turned or spun inwardly upon the annular flange part of said channel portion 3. In the annular flange parts of the channel portions is a plurality of tubular bolts or sleeves 5 each with a head on the outside of said flange parts. The inner end of the sleeve 5 is threaded and a nut 6 is screwed thereon. Positioned between the nut 6 and the adjacent wall of the channel portion of the drum body will be found an angle clip 7 which further strengthens the parts and which is also held in place by said nut. Thus all of the parts are rigidly held in desired placed position by the structure described.

The sleeve 5 is also internally threaded as indicated at 8 and accommodates the threaded end portion 10 of the rod 9. There are a plurality of these various parts but inasmuch as the construction of all are alike, a description of the construction and operation of one thereof will suffice for all. The upper end of the rod 9 extends through a clip 11 which engages the tension hoop 12. The tension hoop 12, in turn, bears against the ring 13 around which is disposed the flesh hoop 15 to which the head vellum or skin 14 is secured. The outer end of the rod 9 is preferably squared so that it can be rotated by means of a key. By turning the rod 9 the flesh hoop 15 can be moved axially of the drum, either to stretch or loosen the head vellum or skin 14 to bring the same to the desired state of tension.

It will be observed that the channel portion of the drum extends outwardly beyond the plane of the adjustable rods so that all danger of injuring or disturbing the rods by engagement with extraneous articles is eliminated. Furthermore by the construction illustrated an extremely rigid durable and efficient drum is provided. The channel construction also performs another important function in that it acts as an expansion chamber for the sound waves set in motion in the playing of the drum, so that overtones are absorbed therein and cannot produce rattling and other objectionable noises. Again the angle clips 7 are important because they assist in rigidifying the drum shell which is made of thin sheet metal.

Such reenforcing or bracing is important in view of the tension exerted upon the resonating chamber formed by the channel portions 3 and 4, and any method of reenforcement that will accomplish its object is contemplated by the invention. It might be desirable to provide a threaded element for receiving the rod 9 independent of the sleeve 5, the primary function of said sleeve being to secure together the interfitting parts 1 and 2. It is obviously within the scope of the invention to secure within the resonating chamber a suitable threaded member having no mechanical connection with the sleeve 5.

I claim:

1. A drum embodying therein a body comprising two body shell members having interengaging channel portions including annular flangelike parts, a head and head ring on each end of the body, a tension hoop engaged with each head ring, sleeves extending through said flangelike parts and securing them together, and tension rods operatively engaged with the tension hoops and threaded into said sleeves in said flangelike parts.

2. A drum embodying therein a body comprising two body shell members having interengaging channel portions including annular flangelike parts, a head and ring on each end of the body, sleeves extending through said flangelike parts and securing them together, tension rods threaded into said sleeves, corner clips engaging portions of said body shell members and said flange parts and through which said sleeves also extend, and nuts threaded on said sleeves and securing said corner clips against said flange parts.

3. A drum comprising a body shell having an annular channel portion including top and bottom annular flangelike parts, a head and a head ring on each end of the body shell, said channel portion defining an expansion chamber extending circumferentially about the body shell at a point between the ends thereof, a tension hoop engaged with each head ring, means for securing together said top and bottom flangelike parts, tension rods engaged with the tension hoops said rods extending through said top and bottom flangelike parts, and means in the channel portion for receiving the ends of the tension rods.

4. A drum comprising a shell having an enlarged intermediate portion to serve as a resonating chamber, heads streached over the margins of the shell, tension rings engaging the margins of the heads, a plurality of tension rods engaging the tension hoops, means in the resonating chamber for receiving the tension rods, and reenforcing elements in the reasonating chamber.

5. A drum embodying therein, a body shell having an annular channel portion including top and bottom annular flangelike parts, a head and head ring on each end of the body shell, said channel portions defining an expansion chamber extending circumferentially about the body shell at a point between the ends thereof, a tension hoop engaged with each head ring, means fixed in said top and bottom flangelike parts for securing said parts together, and tension rods extending through said top and bottom flangelike parts engaged with the tension hoops and operatively secured in said last mentioned means.

In testimony whereof I hereunto affix my signature.

RUSSELL W. HAGEN.